United States Patent [19]
Reuland et al.

[11] 3,914,989
[45] Oct. 28, 1975

[54] METHOD AND APPARATUS FOR TESTING CIGARETTES OR THE LIKE

[75] Inventors: Joachim Reuland; Peter Pinck, both of Hamburg, Germany

[73] Assignee: Hauni Werke & Co. KG, Hamburg, Germany

[22] Filed: Oct. 4, 1974

[21] Appl. No.: 512,317

[30] Foreign Application Priority Data
Oct. 19, 1973   United Kingdom............... 48740/73
Mar. 23, 1974   United Kingdom............... 13020/74

[52] U.S. Cl..................................... 73/69; 73/45.1
[51] Int. Cl.².................... G01N 29/04; G01M 3/00
[58] Field of Search............ 73/69, 67.5 R, 67.6, 41, 73/45, 45.1

[56] References Cited
UNITED STATES PATENTS
3,769,832   11/1973   Baier........................................ 73/41
3,782,180    1/1974   Harris...................................... 73/69

*Primary Examiner*—James J. Gill
*Attorney, Agent, or Firm*—Michael S. Striker

[57] ABSTRACT

The wrappers of cigarettes are tested by passing sound waves at a frequency of 200–600 hertz into the interior of and/or into the space around a wrapper while the respective cigarette is being transported past a testing station. Leaks or similar defects influence the intensity of sound waves, and such changes in intensity are monitored by a device which produces appropriate signals for segregation of cigarettes with defective wrappers from satisfactory cigarettes.

22 Claims, 20 Drawing Figures

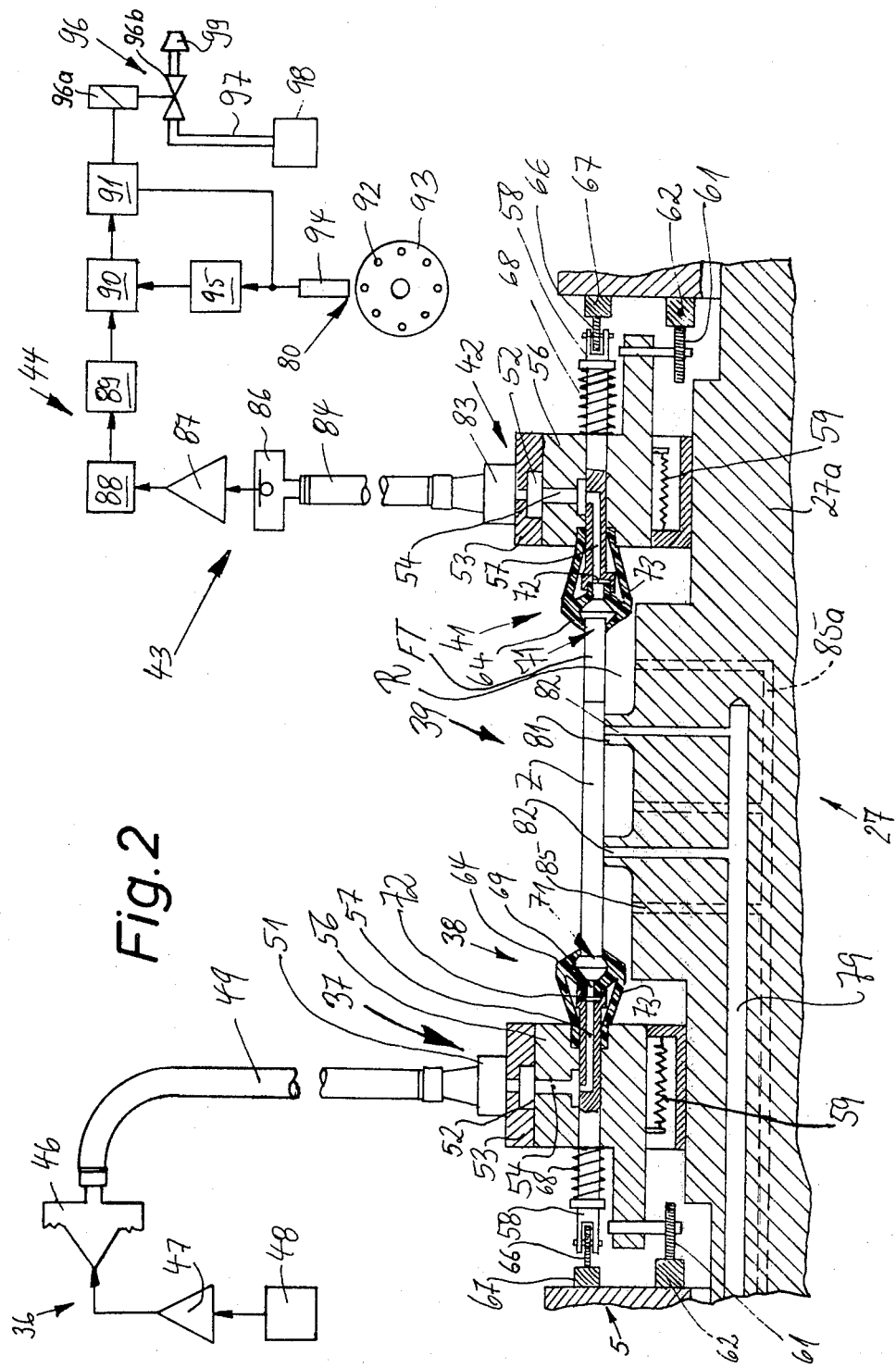

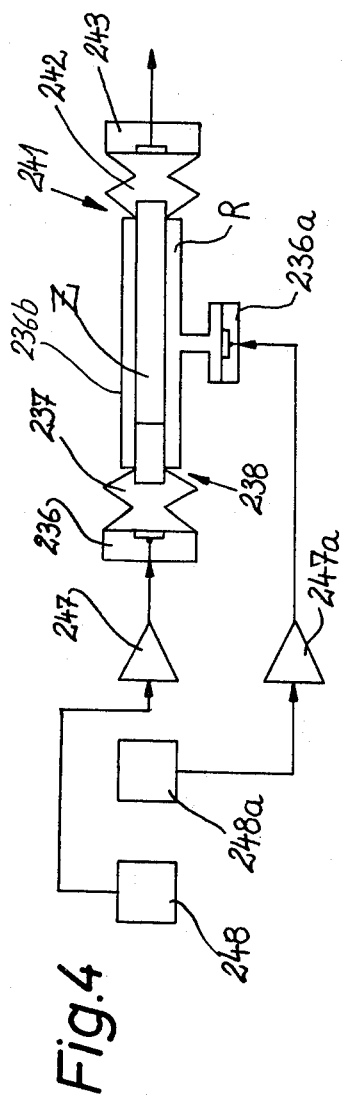
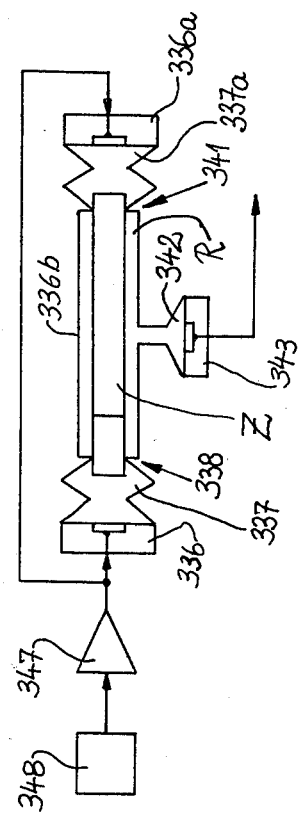
Fig.4
Fig.5

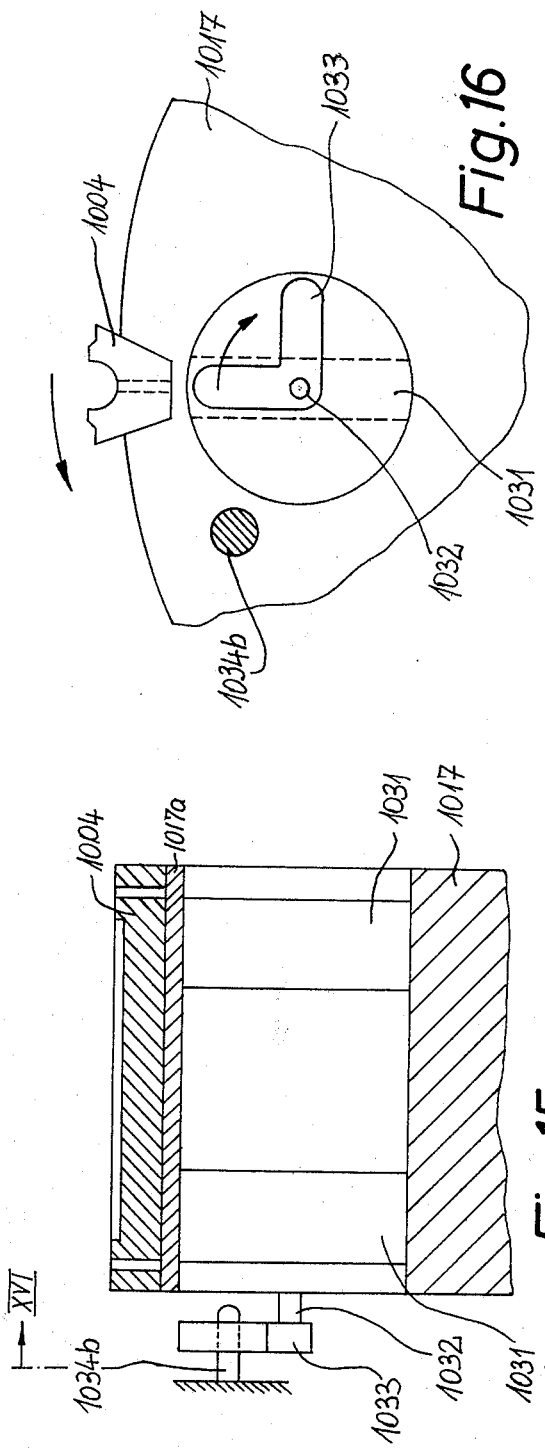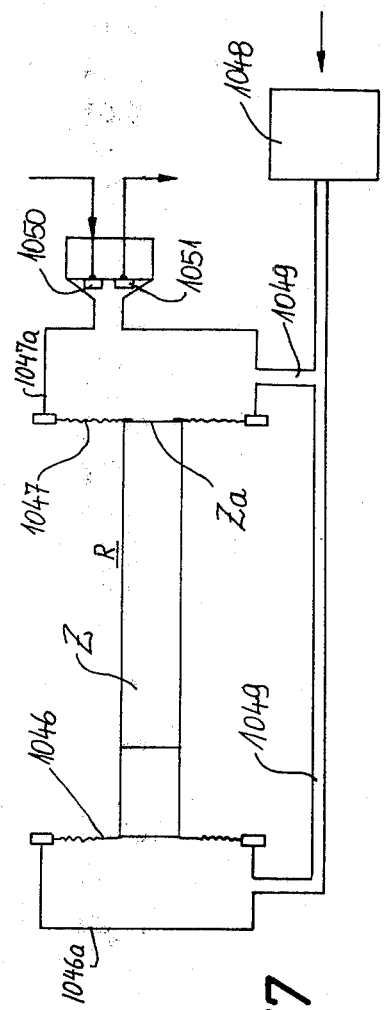

METHOD AND APPARATUS FOR TESTING CIGARETTES OR THE LIKE

BACKGROUND OF THE INVENTION

The present invention relates to a method and apparatus for testing cigarettes or analogous rod-shapped articles wherein a tubular wrapper of cigarette paper, imitation cork, reconstituted tobacco and/or tobacco leaves surrounds one or more rod-like fillers consisting of tobacco and/or filter material. More particularly, the invention relates to improvements in a method and apparatus for testing the wrappers of filter rod sections or plain or filter tipped cigarettes, cigars or cigarillos for the presence or absence of open seams, holes, cracks, leaks between wrapped tobacco fillers and filter tips and/or other defects.

In accordance with the presently prevailing practice, rod-shaped smokers' products (hereinafter referred to as cigarettes or filter cigarettes) are tested with streams of a gaseous fluid. Thus, it is known to introduce a stream of air and another gas into one end of a cigarette and to monitor the pressure and/or another characteristic of the stream which issues at the other end of the cigarette. If the wrapper of the cigarette exhibits one or more leaks, the pressure deviates from a predetermined pressure which is indicative of satisfactory wrappers. The monitoring means then produces signals which can be used for segregation of cigarettes having defective wrappers from satisfactory cigarettes. It is also known to increase or reduce the pressure in the space around the wrapper of a cigarette and to determine the rate at which the fluid flows through the wrapper. If the rate of fluid flow is relatively low (i.e., such as is warranted by the porosity of the wrapper), the cigarette is considered to be satisfactory. On the other hand, if the rate of flow from or into the interior of the wrapper exceeds a predetermined value, the wrapper is likely to have one or more leaks and the signals which are produced by the monitoring means in response to detection of such excessive rate of fluid flow through certain wrappers are used to segregate the respective (defective) cigarettes from satisfactory cigarettes.

The testing with a gaseous fluid is advantageous because the cigarettes can be tested at the same rate at which they issue from a high-speed maker. However, such testing also exhibits certain drawbacks, especially as regards the problems in connection with leakage of testing fluid and the likelihood that the streams of fluid which pass through the wrapper will entrain tobacco particles and/or tobacco dust which will clog the ports, channels and other passages for the flow of compressed air from the articles to the evaluating station or of suction air from the articles to a fan or the like.

SUMMARY OF THE INVENTION

An object of the invention is to provide a novel method of testing cigarettes or analogous rod-shaped articles without resorting to a gaseous testing fluid.

Another object of the invention is to provide a cigarette testing method which is as reliable as heretofore known methods and which can be practiced by resorting to simple and compact instrumentalities.

A further object of the invention is to provide a method of testing cigarettes or the like with a high degree of reproducibility and while the cigarettes are transported at the rate at which they issue from a high-speed manufacturing or processing machine.

An additional object of the invention is to provide a novel and improved testing apparatus which cam be utilized for the practice of the above outlined method.

One feature of the invention resides in the provision of a method of testing cigarettes or analogous rod-shaped articles wherein an open-ended tubular wrapper surrounds a filler of tobacco and/or filter material and the wrapper confines a first space and is surrounded by a second space (i.e., the wrapper separates the space within the article from the space surrounding the wrapper). The method comprises the steps of passing sound waves into at least one of the spaces whereby a variable characteristic (e.g., the intensity) of sound is changed by eventual defects of the wrapper, monitoring the variable characteristic, and producing signals which are indicative of the extent of changes of the characteristic. The variable characteristic may be the intensity of sound which becomes weaker as a result of the passage of sound waves from one space into another space through one or more leaks (open seams, holes, cracks, etc.) in the wrapper.

If the one space is the first space, the sound waves may be introduced at one end of the wrapper and conveyed to a monitoring means from the other end of the wrapper and/or from the second space. If the one space is the second space, the sound waves can be conveyed to the monitoring means from the second space and/or from one or both ends of the wrapper. It is also possible to pass first sound waves into the first space and to pass second sound waves into the second space whereby the second waves are preferably phase-shifted with reference to the first waves (for example, by 180°). The frequency of sound waves may be between 200 and 600 hertz and the articles are preferably moved in the course of the testing operation, e.g., by being transported sideways in the flutes of a rotary drum-shaped conveyor.

The signals which are produced by the monitoring means can be used to segregate articles with defective wrappers from articles having satisfactory wrappers.

Still further, the method may comprise the step of changing the intensity of sound waves in the longitudinal direction of the wrappers, for example, to localize the testing action in those areas of a wrapper which are most likely to exhibit leaks and/or in areas where the absence of leaks is more important than in other areas.

The expression "sound waves" is intended to denote oscillations of air in the interior of and/or in the space surrounding the wrapper of a filler rod section, plain or filter tipped cigarette, plain or filter tipped cigarillo, or plain or filter tipped cigar.

The novel features which are considered as characteristic of the invention are set forth in particular in the appended claims. The improved testing apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged fragmentary transverse vertical sectional view of the testing apparatus, substantially as seen in the direction of arrows from the lines II—II of FIG. 1, certain parts of the testing apparatus being shown diagrammatically and in part broken away;

FIG. 2b is a front elevational view of the sealing device as seen from the right-hand side of FIG. 2a;

FIG. 4 is a fragmentary diagrammatic view of a third testing apparatus with two sound generating devices;

FIG. 5 is a similar fragmentary diagrammatic view of a fourth apparatus which also comprises two sound generating devices;

FIG. 15 is an enlarged fragmentary sectional view as seen in the direction of arrows from the line XV—XV of FIG. 12;

FIG. 16 is a sectional view as seen in the direction of arrows from the line XVI—XVI of FIG. 15;

FIG. 17 is a fragmentary diagrammatic view of a testing apparatus which constitutes a modification of the apparatus of FIG. 12.

DESCRIPTION OF THE PREFERRED EMBODIMENTS

Figure 1:
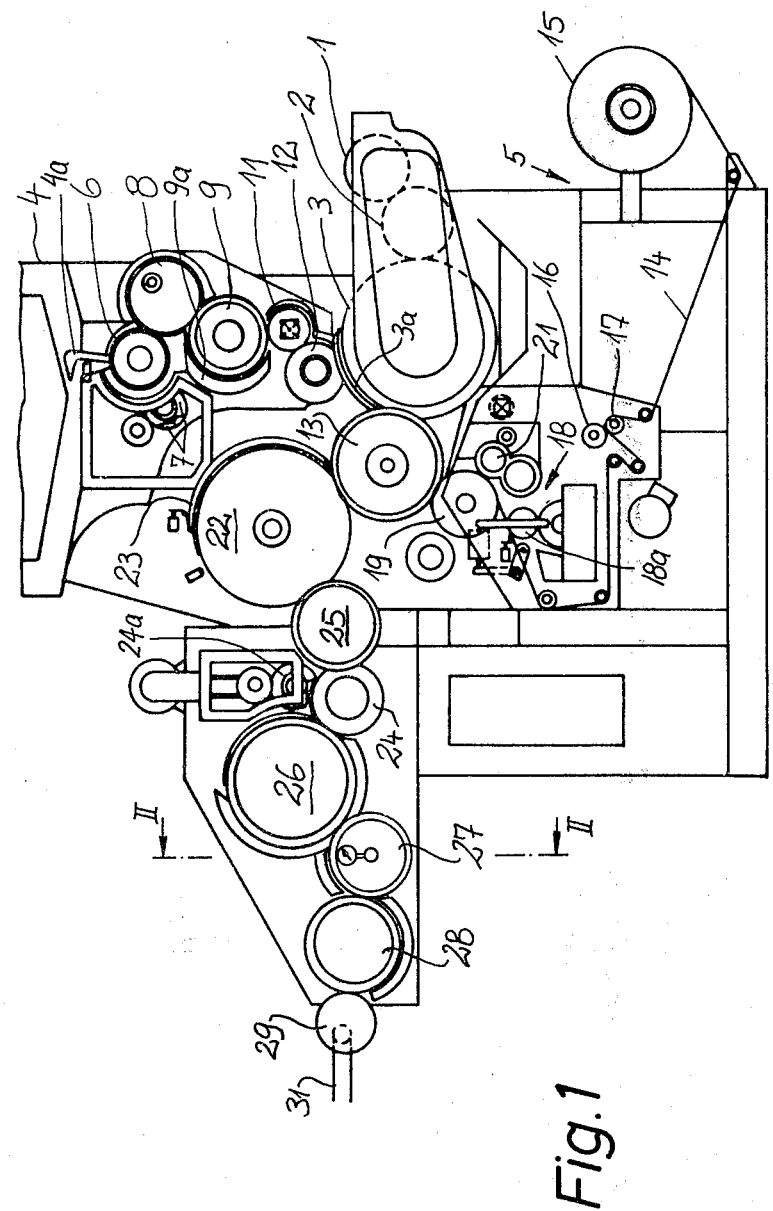
FIG. 1 is a schematic elevational view of a filter cigarette making machine which includes a testing apparatus embodying one form of the invention.

FIG. 1 shows a filter cigarette making machine of the type known as MAX (trademark) produced by Hauni-Werke, Körber & Co. K.G., of Hamburg-Bergedorf, Western Germany. The machine is assumed to be directly coupled with a cigarette rod making machine which supplies plain cigarettes of unit length into successive flutes of a rotary drum-shaped row forming conveyor 1 shown in the right-hand portion of FIG. 1. The plain cigarettes in the flutes of the drum 1 form two discrete rows, i.e., the cigarettes in evenly numbered flutes form one row and are nearer to one axial end of the conveyor 1 and the cigarettes in oddly numbered flutes form the other row and are nearer to the other axial end of the conveyor 1.

The frame 5 of the filter cigarette making machine supports two coaxial rotary drum-shaped aligning conveyors 2 (only one shown) each of which receives a row of cigarettes from the conveyor 1. The aligning conveyors 2 are driven at different speeds and/or transport plain cigarettes of the respective rows through different distances so that each cigarette of one row is aligned with a cigarette of the other row before the conveyors 2 transfer cigarettes into successive flutes of a rotary drum-shaped assembly conveyor 3. The plain cigarettes of each pair of cigarettes in a flute of the assembly conveyor 3 are spaced apart so that they define a gap having a width which at least equals but normally exceeds the length of a filter rod section of double unit length.

The frame 5 supports a magazine or hopper 4 which contains a supply of parallel filter rod sections of six times unit length. A single row of filter rod sections leaves the magazine 4 by way of a downwardly inclined duct 4a which feeds the sections into successive flutes of a rotary drum-shaped severing conveyor 6 cooperating with two rapidly rotating disk-shaped knives 7 to subdivide each filter rod section of six times unit length into a group of three coaxial filter rod sections of double unit length.

The conveyor 6 delivers filter rod sections of double unit length into the flutes of three discrete rotary drum-shaped staggering conveyors 8 (only one shown) so that each conveyor 8 receives one section of a group. The conveyors 8 are driven at different speeds and/or transport the respective filter rods sections through different distances so as to stagger the sections of successive groups, as considered in the circumferential direction of the illustrated conveyor 8. The conveyors 8 deliver the thus staggered sections of double unit length into successive flutes of a rotary drum-shapped shuffling conveyor 9 which cooperates with stationary cams 9a to shift one or more sections in the flutes of the conveyor 9 axially and to form a single row of accurately aligned sections of double unit length wherein each preceding section is in exact register with the next-following section.

The shuffling conveyor 9 delivers successive sections of the thus obtained row into successive flutes of a rotary drum-shaped transfer conveyor 11 which, in turn, delivers successive sections into successive flutes of a rotary drum-shaped accelerating conveyor 12 serving to insert filter rod sections of double unit length into the gaps between pairs of coaxial plain cigarettes of unit length in successive flutes of the assembly conveyor 3. Thus, once a flute of the assembly conveyor 3 advances beyond the transfer station between the conveyors 3 and 12, it contains a group of three coaxial rod-shaped articles including two spaced-apart plain cigarettes of unit length and a filter rod section of double unit length therebetween. The conveyor 3 transports such groups past two stationary cams 3a which cause one or both plain cigarettes of each group to move axially toward the other cigarette of the same group so that the inner end faces of the cigarettes abut against the respective end faces of the filter rod section therebetween. The conveyor 3 thereupon introduces successive condensed groups into successive flutes of a rotary drum-shaped transfer conveyor 13 which is adjacent to a rotary suction drum 19.

The frame 5 supports a bobbin 15 containing a supply of cigarette paper web, imitation cork web or an analogous web 14 which is being withdrawn by two advancing rolls 16, 17 and whose leader is attached to the periphery of the suction drum 19. The web 14 travels along and one of its sides contacts a rotary applicator 18a forming part of a paster 18. The latter further includes a tank and a roller which dips into the tank and applies a film of adhesive paste to the periphery of the applicator 18a. The suction drum 19 cooperates with a rotary knife 21 to sever the leader of the web 14 at regular intervals and to thus form a succession of adhesive-coated uniting bands which are attached to successive groups in the flutes of the transfer conveyor 13 in such a way that each uniting band extends tangentially of the respective group and contacts the filter rod section of double unit length as well as the adjacent inner end portions of the corresponding plain cigarettes.

The transfer conveyor 13 delivers successive groups (each such group consists of two plain cigarettes, a filter rod section of double unit length and an adhesive-coated uniting hand) to a rotary wrapping conveyor 22 which cooperates with a stationary or mobile rolling device 23 so as to cause successive groups to rotate about their respective axes and to thereby convert the respective uniting bands into tubes which surrounds the corresponding filter rod sections and the adjacent inner end portions of associated plain cigarettes. Thus, each group which advances beyond the rolling device 23 constitutes a filter cigarette of double unit length.

The wrapping conveyor 22 delivers successive filter cigarettes of double unit length into successive flutes of a rotary drum-shaped transfer conveyor 25 which supplies the cigarettes to the flutes of a severing conveyor 24 cooperating with a rotary disk-shaped knife 24a to sever each filter cigarette of double unit length midway between its ends so that each such cigarette yields two coaxial filter cigarettes Z (see FIG. 2) of unit length.

The severing conveyor 24 delivers pairs of filter cigarettes Z to a turn-around device 26 of known design which inverts one cigarette Z of each pair end-for-end and places it into the space between two adjoining non-inverted cigarettes so that all of the cigarettes Z form a single row and the filter tops of all cigarettes face in the same direction. The inverting device 26 delivers the cigarettes Z of the thus obtained single row into successive flutes of a rotary drum-shaped conveyor 27 forming part of a first cigarette testing apparatus. This testing apparatus examines the wrappers of cigarettes Z for the presence or absence of holes, open seams, cracks, and/or other defects and includes means for producing signals which are utilized to segregate satisfactory cigarettes from cigarettes having defective wrappers. The conveyor 27 delivers cigarettes Z (or at least the satisfactory cigarettes Z) into successive flutes of a rotary drum-shaped conveyor 28 forming part of the second testing apparatus which examines the tobacco-containing ends of successive cigarettes Z and includes means for generating signals which are indicative of cigarettes with unsatisfactory (too soft) tobacco-containing ends. The conveyor 28 delivers the cigarettes Z (or at least those cigarettes whose tobacco-containing ends are satisfactory) into successive flutes of a rotary drum-shaped transfer conveyor 29 which delivers the cigarettes onto the upper stretch of an endless take-off belt conveyor 31. The latter can deliver cigarettes Z to storage, to a tray filling apparatus, or directly into a packing machine, not shown.

The ejection or segregation of cigarettes Z whose wrappers are defective can take place before the defective cigarettes reach the conveyor 28, during travel with the conveyor 28, or during travel with the conveyor 29. If desired, the cigarettes Z having defective wrappers can be segregated simultaneously with cigarettes having defective tobacco-containing ends. The means for ejecting may comprise one or more nozzles for compressed air which are adjacent to a predetermined portion of the path of movement of successive cigarettes Z and permit a blast of compressed air to expel a defective cigarette Z (by moving the cigarette axially or radially of the respective rotary conveyor) at the exact moment when the defective cigarette is located in the aforementioned portion of its path.

FIG. 2 shows a portion of the conveyor 27 and the remaining components of the first testing apparatus which monitors the cigarettes Z and produces signals for segregation of cigarettes having defective wrappers. The remaining components include a stationary sound generating unit 36, means 37 for conveying sound waves from the stationary unit 36 to one end of a cigarette Z which arrives at the testing station, first sealing devices 38 which sealingly engage the adjacent ends of wrappers of cigarettes Z at the testing station, second sealing devices 41 which engage the other ends of the wrappers of cigarettes Z when the left-hand ends of such wrappers are engaged by the corresponding sealing devices 38, means 42 for conveying sound waves from the other end of a wrapper at a testing station, stationary means 43 for receiving sound waves from the conveying means 42 and for monitoring a characteristic of sound which varies as a result of the presence of leaks in a wrapper at the testing station, and evaluating means 44 which evaluates the electric signals supplied by the means 43 and controls an ejector 96 for cigarettes Z with defective wrappers. The conveyor 27 comprises a rotary drum-shaped body 27a whose periphery is formed with cigarette-receiving flutes 39 each of which is parallel to the axis of the drum 27a.

The sound generating 36 comprises a loudspeaker 46 which is connected with the output of an oscillator circuit 48 by way of an amplifier 47 so as to receive impulses at a frequency which is preferably in the range of 200–600 hertz. The sound waves which are emitted by the loudspeaker 46 are transmitted to a stationary shoe 51 of the first conveying means 37 by a conduit 49. The shoe 51 has a concave surface which contacts the peripheral surface of a ring 53 rotating with the drum 27a. The ring 53 has an annular channel 52 which transmitts sound waves to a channel 54 in a holder 56 which is reciprocable in the ring 53 in parallelism with the axis of the drum 27a. The holder 56 can be said to constitute the housing or body of a valve which further comprises a plunger 58 having an axial bore 57 in communication with the respective channel 54 during travel of the plunger past the testing station. A spring 59 biases the holder 56 in a direction to the left, as viewed in FIG. 2, so that a roller follower 61 of the holder 56 bears against the face of a stationary cam 62 in the frame 5. A roller follower 66 at the outer end of the plunger 58 bears against and tracks a second endless cam 67 in the frame 5 under the action of a helical spring 68 which reacts against the holder 56 and bears against a flange of the plunger 58. A holder 56 and a plunger 58 is provided for each flute 39 of the drum 27a. Each spring 59 reacts against a bracket of the drum 27a inwardly of the respective holder 56.

The sealing device 38 is mounted in part on the plunger 58 and in part in the corresponding holder 56 and comprises an elastically deformable sleeve 64 having an outer tubular portion 73 whose rear end 76 (see FIG 2a) is anchored in the holder 56 and an inner tubular portion 72 which surrounds and moves with the inner end of the plunger 58. The passage 69 of the inner tubular portion 72 communicates with the bore 57 of the plunger 58. When the plunger 58 is moved inwardly relative to the respective holder 56, it enlarges the diameter of an opening 71 in a ring-shaped sealing lip 74 at the front end of the tubular portion 73 so that the opening 71 can readily receive the adjacent end of the wrapper of a cigarette Z in the respective flute 39.

Figure 2B:
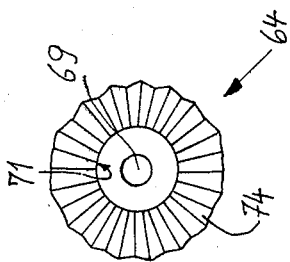
Figure 2A:
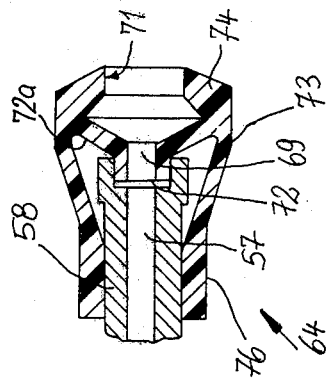
FIG. 2a is an enlarged axial sectional view of a sealing device in the testing apparatus of FIG. 2.

FIG. 2a shows a sleeve 64 on a greatly enlarged scale. It will be seen that when the plunger 58 is moved in a direction to the right, the front end of the tubular portion 72 causes a conical web 72a to enlarge the inner diameter of the lip 74 so that the diameter of the opening 71 exceeds the diameter of a cigarette Z. The outer side of the lip 74 can be corrugated or toothed (as shown in FIG. 26) to enhance its elasticity and deformability so that the lip can sealingly engage a wrapper which extends into the sleeve 64, i.e., into the opening 71.

Each flute 39 has two aligned projections or lands 81 (FIG. 2) with radially inwardly extending suction ports 82 which attract the wrapper of a cigarette Z during travel with the drum 27a. The lands 81 are located between the aligned sealing devices 38, 41 and the ports 82 for each flute 39 communicate with a discrete channel 79 which is machined into the drum 27a and is open at its left-hand end, as viewed in FIG. 2. The channels 79 which are associated with flutes 39 containing cigarettes Z (i.e., those channels 79 which travel from the transfer station between the turn-around device 26 and the drum 27a toward the transfer station between the drum 27a and conveyor 28 of FIG. 1) communicate with the arcuate groove in a stationary valve plate (not shown) which is closely adjacent to the left-hand end face of the drum 27a and whose groove is connected with a suction generating device in a manner well known from the art of filter cigarette making and like machines. Reference may be had to the valve plate 1009 and groove 1007, 1021 of FIG. 12.

Each sealing device 41 is identical with and mirror symmetrical to a sealing device 38. Also, the means 42 for conveying sound waves from successive sealing devices 41 to the monitoring means 43 is preferably identical with and mirror symmetrical to the conveying means 37. Therefore, many component parts of the sealing device 41 and conveying means 42 shown in FIG. 2 are denoted by reference characters similar to those used for the parts of sealing device 33 shown in FIGS. 2, 2a, 2b and conveying means 37 of FIG. 2. The only difference is that the stationary shoe of the conveying means 42 is denoted by the reference character 83 and the conduit from the shoe 83 to the monitoring means 43 by the reference character 84.

The monitoring means 43 comprises a suitable microphone 86 which converts the sound waves transmitted by conduit 84 into corresponding electrical vibration impulses. Such impulses are transmitted to an amplifier 87 which is connected with the input of a selective filter 88. The latter transmits only those impulses which are within a preselected frequency range (e.g., between 200 and 600 hertz), and such impulses reach the input of a threshold circuit 89 (e.g., a Schmitt-trigger) which is followed by a gate circuit 90 and a time-delay unit 91 (e.g., a shift register). The last stage of the shift register 91 is connected with the solenoid 96a of a normally closed valve 96b forming part of the ejector 96 and installed in a conduit 97 which connects a source 98 of compressed gas (preferably air) with an ejector nozzle 99 for defective cigarettes Z.

The gate circuit 90 has a second input which is connected with a proximity detector 94 by way of a monostable multivibrator 95. The detector 94 forms part of a pulse generator 80 having a disk 93 which rotates in synchronism with the drum 27a and has several magnets 92, one for each flute 39 of the drum 27a. The detector 94 transmits a signal to the monostable multivibrator 95 and to the stages of the shift register 91 whenever it is approached by one of the magnets 92 on the disk 93. The purpose of the multivibrator 95 is to act as a timer, i.e., to transmit to the second input of the circuit 90 a signal of predetermined duration irrespective of the duration of a signal from the detector 94. The circuit 90 can transmit a signal from the threshold circuit 89 to the first stage of the shift register 91 while its second input receives a signal from the monostable multivibrator 95. The detector 94 transmits a signal to the input of the monostable multivibrator 95 whenever a cigarette Z travels through the testing station (between the shoes 51, 83). The delay with which a signal which has been transmitted from the threshold circuit 89 to the first stage of the shift register 91 reaches the solenoid 96a of the normally closed valve 96b is identical with the interval which is required to advance a cigarette Z from the testing station to the ejecting station, i.e., from the space between the shoes 51, 83 into register with the orifice or orifices of the ejector nozzle 99. The latter can be installed at any convenient location downstream of the testing station. For example, the nozzle 99 can be placed adjacent to the path of cigarettes Z in the flutes of the transfer conveyor 29 of FIG. 1; This is advantageous insofar as the solenoid 96a can be connected with the signal generating means of the second testing unit including the conveyor 28 so that the ejecting station for cigarettes Z having defective wrapper coincides with the ejecting station for cigarettes having defective tobacco-containing ends. The tobacco-containing end of a cigarette is considered defective if it is too soft or too dense (normally too soft as a result of escape of tobacco shreds from that end of a wrapper which is remote from the filter tip). An advantage of the just discussed common ejecting station for all types of defective cigarettes is that a single nozzle 99 suffices for segregation of all cigarettes having defective wrappers and/or defective tobacco-containing ends as well as that all such cigarettes can be collected in a single receptacle.

Alternatively, and as shown in FIG. 2, the nozzle 99 can admit compressed air into a selected channel 85a of the drum 27a; each channel 85a communicates with several radially outwardly extending ports 85 which can direct blasts of compressed gas against the wrapper of a cigarette Z in the corresponding flute 39 to thus expel the cigarette from the conveyor 27 at a time when the corresponding flute 39 is adjacent to a receptacle (not shown) for cigarettes Z having defective wrappers. For example, a channel 85a can receive compressed air during travel past a second groove of the aforementioned valve plate at the left-hand end of the drum 27a; and such groove is connected to the conduit 97 to receive compressed air in response to opening of the valve 96b. The blasts of air issuing from the ports 85 must be strong enough to overcome the suction in corresponding ports 82 of the drum 27a.

It is further clear that the loudspeaker 46 can be replaced by another suitable sound generating unit, e.g., by a piezoelectric sound generator. Analogously, the microphone 86 can be replaced with a piezoelectric receiver. The crystals used in piezoelectric sound generating and receiving means may be naturally occuring or synthetic crystals.

The operation of the testing apparatus including the structure of FIG. 2 is as follows.

The turn-around device 26 of FIG. 1 forms a single row of filter cigarettes Z of unit length whereby the filter tips FT (see FIG. 2) of all cigarettes Z face in the same direction. Successive cigarettes Z of the thus obtained single row are introduced into successive flutes 39 of the drum 27a while the sleeves 64 of the respective sealing devices 38 and 41 are retracted (i.e., while the distance between the openings 71 of the two sleeves 64 shown in FIG. 2 exceeds the length of a cigarette Z). Each cigarette Z which enters a flute 39 is immediately attracted by suction in the ports 82 of the respective lands 81. As a freshly filled flute 39 advances beyond the transfer station between the turn-around device 26 and drum 27a, the corresponding portions of the cams 62 and 67 cause the respective holders 56 and plungers 58 to move inwardly, i.e., toward the cigarette Z in the flute. The configuration of the cams 62 and 67 is such that the plunger 58 cause the webs 72a to enlarge the openings 71 while the holders 56 move toward the corresponding ends of the cigarette Z so that the ends of the wrapper of such cigarette can enter the respective sleeves 64. The plungers 58 thereupon allow the lips 74 to contact and move to sealingly engage the respective ends of the wrapper not later than when the cigarette Z reaches the testing station (i.e., the space between the stationary shoes 51 and 83). In other words, the lips 74 seal the interior of a cigarette wrapper from the surrounding space R (FIG. 2) not later than when the channels 54 of the corresponding holders 56 move into register with the shoes 51, 83. The sound waves which are emitted by the loudspeaker 46 and conveyed by the conduit 49 are then free to pass through the wrapper of the cigarette Z at the testing station and to pass through the conduit 84 on to the microphone 86. The impulses produced by the microphone 86 are amplified at 87 and transmitted to the filter circuit 88 which allows certain impulses to reach the threshold circuit 89. The latter compares the intensity of such impulses with a predetermined intensity and allows impulses which exceed a value indicating a satisfactory wrapper to pass on to the gate circuit 90. The pulse generator 80 causes the gate circuit 90 to permit the passage of impulses (if any) at intervals corresponding to those at which successive cigarettes Z enter the testing station, and the impulses which reach the first stage of the shift register 91 are transmitted to the solenoid 96a with a delay as described above so that the valve 96b opens and admits compressed gas into the nozzle 99 at the exact moment when the nozzle is in register with the corresponding defective cigarette Z. If desired, the circuit arrangement shown in the upper right-hand portion of FIG. 2 may include a further amplifier which is connected between the last stage of the shift register 91 and the solenoid 96a. As mentioned above, the nozzle 99 can admit compressed gas into the corresponding channel 85a of the drum 27a, or the discharge end of the conduit 97 can be connected with the second groove of the aforementioned valve plate so that the defective cigarette Z is ejected from its flute 39 while the corresponding channel 85a registers with the second groove. The ejecting station is preferably located sufficiently downstream of the testing station to insure that the cams 62 and 67 cause the respective sleeves 64 to become disengaged from the defective cigarette Z before the latter reaches the ejecting station. Such disengagement of the sleeves 64 must be completed not later than when a cigarette reaches the transfer station between the drum 27a and the conveyor 28 so that the flutes of the conveyor 28 can receive cigarettes whose wrappers are free of defects. As mentioned above, the cigarettes which travel with the conveyor 28 are thereupon examined to determine the density of the outer ends of their rod-like tobacco fillers.

The testing apparatus of FIG. 2 detects the weakening of sound as a result of the passage of some sound waves through the leaks of a wrapper into the space R around the wrapper while the respective cigarette Z advances past the testing station.

The utilization of a stationary sound generating unit (36) and stationary receiving or monitoring means (43) is desirable and advantageous because of the testing apparatus need not be provided with discrete sound generating and monitoring means for each flute 39 of the conveyor 27. Instead, the sound waves which are generated by 36 are caused to pass into the spaces within the wrappers of successive cigarettes z via a single conveying means 37 and successive sealing devices 38 of the conveyor 27. Analogously, sound waves issuing from the wrappers of successive cigarettes Z are caused to reach the stationary receiving or monitoring means 43 by way of successive sealing devices 41 and a single conveying means 42.

The sealing devices 38, 41 reduce the likelihood of misleading measurements due to uncontrollable entry of sound waves into the interior of wrappers which are being transported past the testing station.

Figure 3:
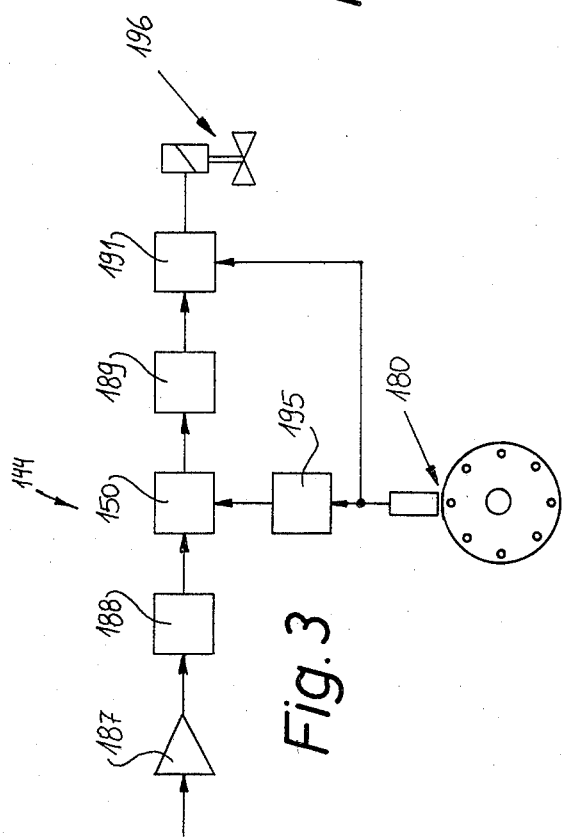
FIG. 3 is a fragmentary diagrammatic view of a testing apparatus which constitutes a first modification of the testing apparatus of FIG. 2.

FIG. 3 shows modified evaluating means 144 wherein the amplifier 187 receives signals from the microphone 86 (not shown) and transmits signals to a selective filter circuit 188. The gate circuit 90 of FIG. 2 is replaced with an integrating circuit 150 which is connected between the circuit 188 and threshold circuits 189 and has a second input connected to the monostable multivibrator 195. The latter receives pulses from the pulse generator 180 which is further connected to the stages of the shift register 191. The ejector 196 is analogous to the ejector 96 of FIG. 2.

In its simplest form, the integrating circuit 150 may consist of an R-C link. However, it is equally within the purview of the invention to employ a more complex integrating circuit. The multivibrator 195 transmits signals when the sound waves furnished by loudspeaker 46 (not shown in FIG. 3) can pass through the wrapper of a cigarette at the testing station. The circuit 150 integrates the signals from 188 during such interval and transmits a corresponding signal to the threshold circuit 189. When the intensity or another characteristic of such signal is within a range which is indicative of a satisfactory wrapper, the first state of the shift register 191 does not receive a signal and the corresponding cigarette can advance beyond the ejector 196. If the signal for 150 to 189 is indicativie of a defective wrapper, the corresponding cigarette is segregated during travel past the nozzle (not shown) of the ejector 196.

Figure 12:
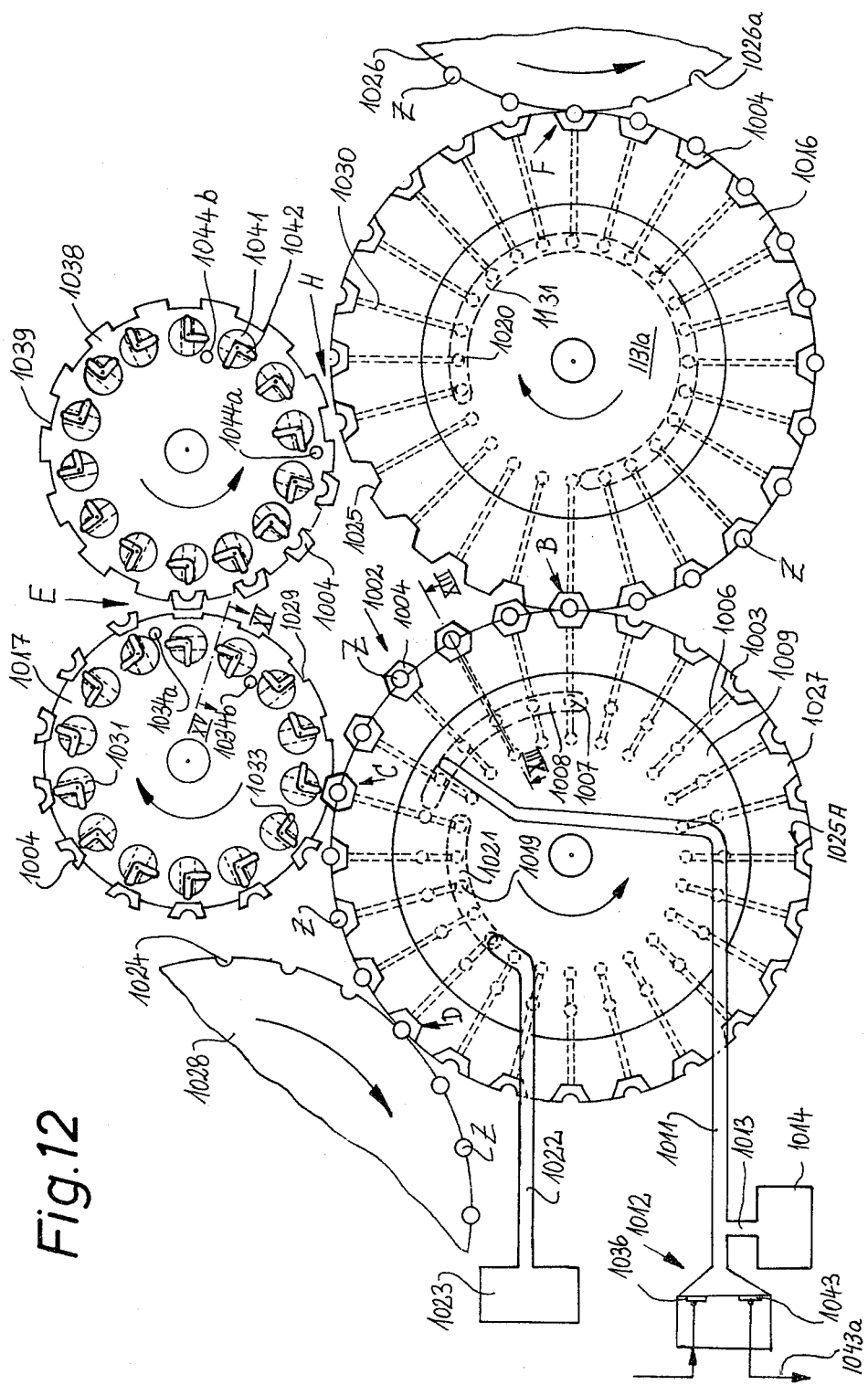
FIG. 12 is a fragmentary elevational view of a filter cigarette making machine which embodies still another testing apparatus.
Figures 13, 14:
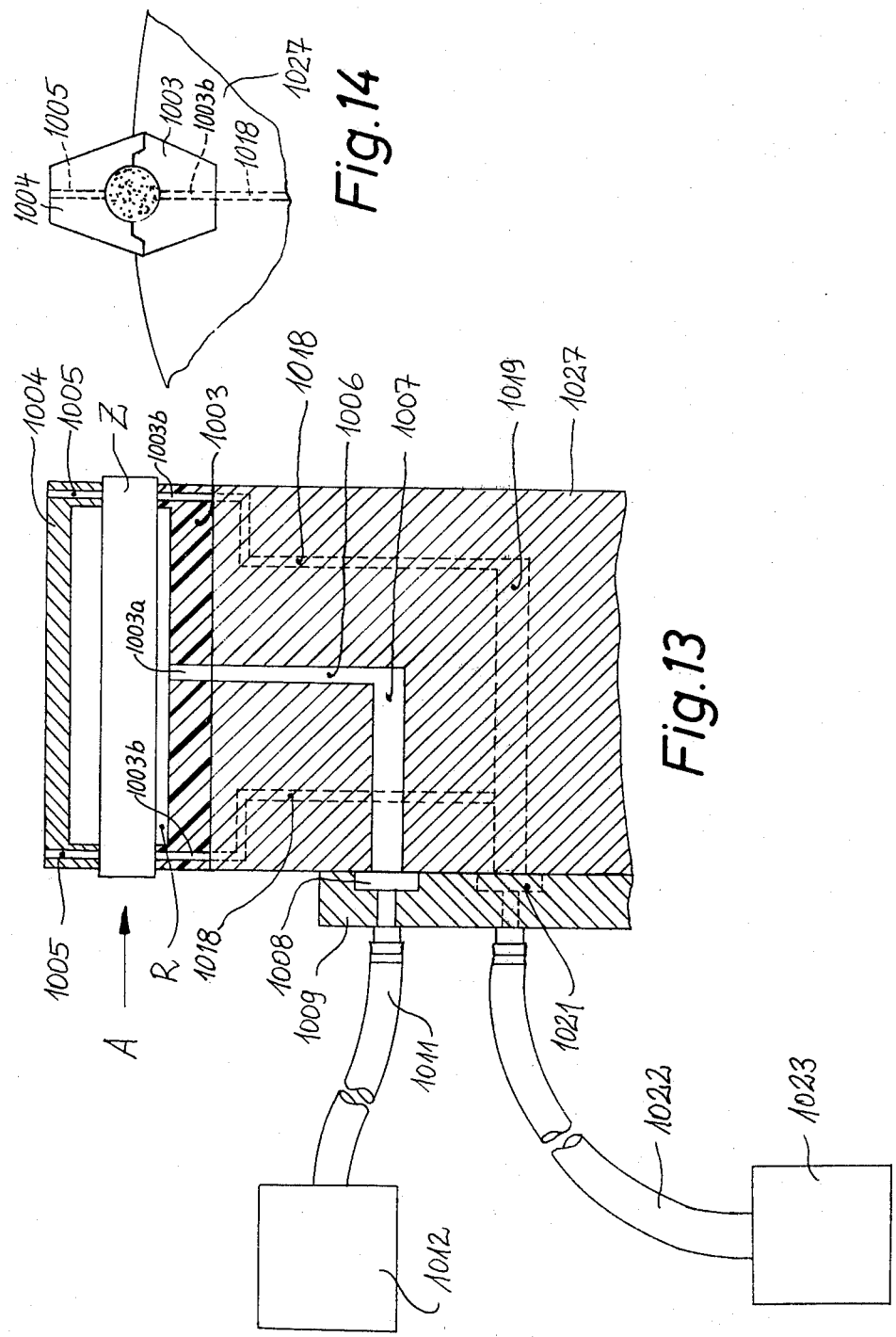
FIG. 13 is an enlarged fragmentary sectional view as seen in the direction of arrows from the line XIII—XIII of FIG. 12.
FIG. 14 is a fragmentary end elevational view as seen in the direction of arrow A in FIG. 13.

FIG. 4 shows a portion of a further apparatus wherein sound waves are caused to pass through a wrapper at the testing station the same as in FIG. 2, and also into the space R surrounding the wrapper. The sound waves in the space R are phase-shifted with reference to those which pass through the wrapper, preferably by 180 degrees. This testing apparatus employs two oscillators 248, 248a which are respectively connected with amplifiers 247, 247a and sound generators 236, 236a. The generators 248, 248a transmit sound waves which are phase-shifted by 180°. The parts 237, 238, 241, 242, 243 correspond to similarly referenced parts of FIG. 2. The reference character 236b denotes an enclosure which surrounds the space R. Due to the aforementioned phase shift, the losses in sound during passage of sound waves through the defective wrapper of a cigarette Z at the testing station are increased and the percentage of sound waves which are generated at 236 and reach the monitoring means 243 is reduced accordingly. The manner in which an enclosure 236b can be formed around the space R surrounding the wrapper of a moving cigarette Z at the testing station is shown in FIGS. 12-14.

The testing apparatus of FIG. 5 constitutes a modification of the apparatus of FIG. 4. This apparatus comprises two sound generators 336, 336a which are connected with an oscillator 348 by way of an amplifier 347. Sound waves which are generated by 336, 336a are transmitted into the respective ends of the wrapper of a cigarette Z at the testing station by conveying means 337, 337a and sealing devices 338, 341. The monitoring means 343 is connected with the enclosure 336b for the space R by way of conveying means 342. If a wrapper exhibits a leak, sound waves supplied by 336, 336a pass through the leak and into the space R to be picked up by the monitoring means 343. The latter produces oscillations of corresponding intensity to thus indicate the extent of damage to the wrapper.

It will be seen that, in contrast to the apparatus of FIG. 4 wherein sound can pass from the space R into the space within a wrapper by passing through one or more leaks in the wrapper, the apparatus of FIG. 5 is designed to effect the passage of sound from the space within the wrapper into the space R whereby the waves pass through one or more leaks in the wrapper.

Figure 6:
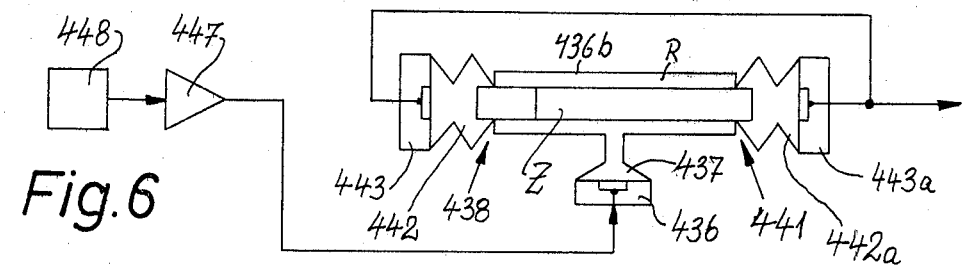
FIG. 6 is a fragmentary diagrammatic view of a fifth testing apparatus.

The testing apparatus of FIG. 6 has an oscillator 448, an amplifier 447, a sound generator 436 which is connected with the enclosure 436b by conveying means 437, two sealing devices 438, 441 for each flute of the drum (now shown) two conveying means 442, 442a, and two monitoring means 443, 443a. Sound waves which enter the interior of a cigarette Z through a defective wrapper (which may have an open seam or one or more holes) leave the wrapper at both ends and are conveyed to the respective monitoring means 443, 443a. The manner in which the space R around a cigarette Z at the testing station is confined by the enclosure 436b is the same as shown for the enclosures 1002 of FIGS. 12-14. The monitoring means 443, 443a produce electric signals which are transmitted to an evaluating means such as the circuit arrangement 44 of FIG. 2.

Figure 7:
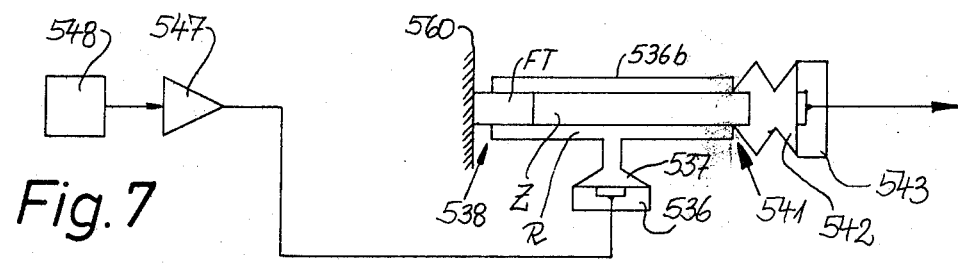
FIG. 7 is a fragmentary diagrammatic view of a sixth testing apparatus.

FIG. 7 shows a further testing apparatus with a modified conveyor wherein one end of the wrapper of a cigarette Z at the testing station (namely, that end which contains the filter rod section or filter tip FT) bears against a flange or wall 560 of the drum and the other end is engaged by a sealing device 541 connected with a monitoring means 543 by conveying means 542. The oscillator 548 is connected with a sound generator 536 via amplifier 547, and the sound generator 536 is connected with the enclosure 536b by conveying means 537. Sound waves which pass from the space R through the leak of a defective wrapper and into the interior of the cigarette Z at the testing station leave the wrapper through the right-hand end and are conveyed to the monitoring means 543. The sealing devices 538 and 541 may form part of the enclosure 536B (this also applies for the apparatus of FIGS. 4-6).

Figure 8:
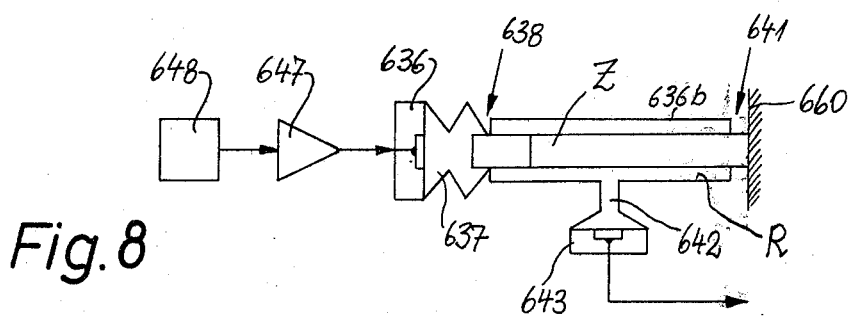
FIG. 8 is a fragmentary diagrammatic view of a seventh testing apparatus.

In the testing apparatus of FIG. 8, the wall or flange 660 of the conveyor engages the tobacco-containing end of the wrapper of a cigarette Z at the testing station. The oscillator 648 is connected with a sound generator 636 by way of an amplifier 647, and the sound generator produces sound waves which pass into the filter tipped end of the cigarette by way of conveying means 637 and sealing device 638. The monitoring means 643 is connected with the enclosure 636b by conveying means 642. The enclosure 636b for the space R is formed in part by the sealing devices 638, 641. Sound waves pass through leaks of defective wrappers and reach the monitoring means 643 to be converted into electrical signals which are used to effect segregation of cigarettes Z with defective wrappers.

Figure 9:
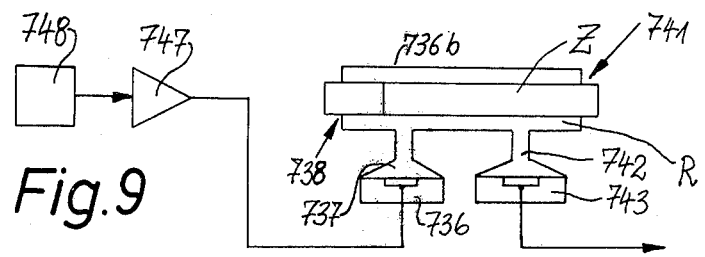
FIG. 9 is a fragmentary diagrammatic view of an eighth testing apparatus.

In the testing apparatus of FIG. 9, the oscillators 748 is connected with a sound generator 736 via amplifier 747, and the sound generator produces sound waves which enter the space R within the enclosure 736b via conveying means 737. The sealing devices 738, 748 of the enclosure 736b engage the wrapper of a cigarette Z close to the respective ends but the ends of the wrapper remain open. The monitoring means 743 is connected to the enclosure 736b by conveying means 742. The passage of sound waves from the conveying means 737 to the conveying means 742 is influenced by the defects of wrappers at the testing station. In this apparatus, the sound reaching the monitoring means 743 is weakened to an extent which is proportional to the rate of passage of sound waves into the interior of the cigarette Z through one or more leaks of the wrapper.

Figure 10:
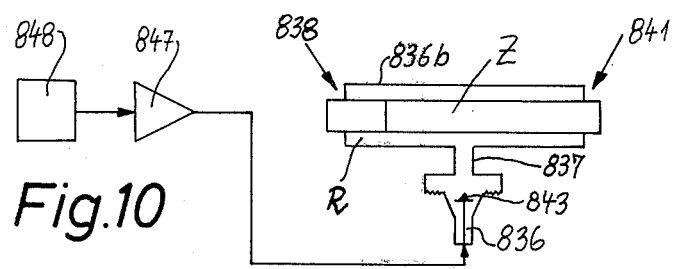
FIG. 10 is a fragmentary diagrammatic view of a ninth testing apparatus.

FIG. 10 shows a testing apparatus wherein the sound generator 836 (e.g., a loudspeaker) is connected with an oscillator 848 via amplifier 847 and with the enclosure 836B for the space R by conveying means 837. The sealing devices 838, 841 form part of the enclosure 836b. The monitoring means 843 detects variations of sound as a result of defects in the wrapper of a cigarette Z at the testing station and produces electrical signals which are used for segregation of cigarettes with defective wrappers. The monitoring means 843 may constitute a microphone.

Figure 11:
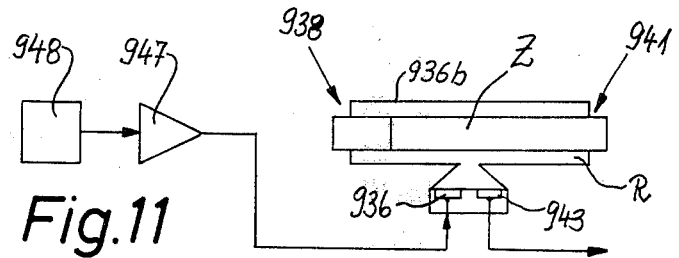
FIG. 11 is a fragmentary diagrammatic view of a tenth testing apparatus.

The testing apparatus of FIG. 11 constitutes a modification of the apparatus of FIG. 10 and all such parts which are identical or analogous to those described in connnection with FIG. 10 are denoted by similar reference characters plus 100. The sound generator 936 is a piezoelectric crystal and the monitoring means 943 is also a piezoelectric crystal.

FIg. 12 shows a portion of a filter cigarette making machine having a turn-around device for one row of filter cigarettes of unit length. This turn-around device comprises a rotary drum-shaped conveyor 1026

(shown in the right-hand portion of FIG. 12) whose flutes 1026a deliver successive cigarettes Z of a single row of such cigarettes (the filter tips of all cigarettes forming this row already face in the same direction) to a transfer station F where the cigarettes are accepted by elongated trough-shaped portions 1004 of flutes while the portions 1004 adhere to and extend into recesses 1025 provided in the periphery of a rotary drum-shaped intermediate conveyor 1016.

The testing conveyor is shown at 1027; this conveyor again comprises a drum-shaped rotary body whose periphery is formed with equally spaced parallel recesses 1025A for elastically deformable trough-shaped flute portions 1003. When the conveyor 1027 receives a trough-shaped portion 1004 from the intermediate conveyor 1016 (at a transfer station B), the thus received portion 1004 forms with the adjacent trough-shaped portion 1003 a complete flute 1002 which constitutes an enclosure for a cigarette Z, e.g., an enclosure of the type shown schematically at 236b in FIG. 4. It will be seen each enclosure or flute 1002 consists of two portions or halves one (1003) of which is permanently mounted on the conveyor 1027 and the other of which temporarily overlies and sealingly engages the corresponding portion 1003 during travel of portions 1003 from the transfer station B to a transfer station C where the portions 1004 are taken over by a second intermediate conveyor 1017 serving to return the portions 1004 to the first intermediate conveyor 1016 by way of a third intermediate conveyor 1038. The trough-shaped portions 1002 may consist of rubber or an elastomeric synthetic plastic material, and the trough-shaped portions 1004 are assumed to be made of iron or another ferromagnetic material.

Each elastic portion 1003 is formed with a port or duct 1003a communicating with a radial port or duct 1006 in the body of the conveyor 1027 (see particularly FIG. 13). The inner end portion of each port 1006 communicates with a discrete channel 1007 which is machined into and is parallel to the axis of the conveyor 1027. Each channel 1007 is a blind bore the open end of which is adjacent to one axial end of the conveyor 1027, i.e., to the left-hand axial end, as viewed in FIG. 13. During travel from the transfer station B toward the transfer station C, successive channels 1007 communicate with an arcuate groove 1008 machined into the adjacent surface of a stationary valve plate 1009. The groove 1008 is connected with a component 1012 of the testing apparatus by conveying means 1011. The component 1012 includes a sound generating means 1036 and a sound monitoring means 1043. Thus, the testing apparatus of FIG. 12 is similar to that shown in FIG. 10 or 11.

The conveying means 1011 is a conduit which has a branch 1013 connected with a suction generating device 1014, e.g., a simple fan. The purpose of the suction generating device 1014 is to maintain the spaces R which travel from the transfer station B to the transfer station C at a pressure which is slightly below atmospheric pressure to this insure that the trough-shaped portions 1004 will remain in sealing engagement with the registering trough-shaped portions 1003 during travel from the station B toward the station C.

FIG. 13 shows that the conveyor 1027 is formed with additional ports or ducts 1018 which communicate with blind bores or channels 1019. The outer end portions of the ports 1018 communicate with ports 1003b in the trough-shaped portions 1003. The open ends of channels 1019 travel along and register with a second arcuate groove 1021 of the stationary valve plate 1009 while the corresponding flute portions 1003 travel from the transfer station C to a transfer station D between the conveyor 1027 and the conveyor 1028 of the second testing unit. The conveyor 1028 corresponds to the conveyor 28 of FIG. 1 and has flutes 1024 for discrete cigarettes Z.

The groove 1021 is connected with a suction generating device 1023 by way of a suction pipe 1022. The device 1023 insures that the cigarettes Z which have been tested during travel between the transfer stations B and C remain in the respective flute portions 1003 during travel from the station C to the transfer station D where the cigarettes are introduced into successive flutes 1024 of the conveyor 1028.

FIGS. 13 and 14 show that the portions 1004 of the flutes 1002 are formed with pairs of ports 1005 which communicate with ducts (not shown) extending inwardly from the recesses 1025 of the intermediate conveyor 1016. The inner end portions of the just mentioned ducts communicate with channels or blind bores 1020 which are machined into the body of the conveyor 1016 and the open ends of which communicate with the arcuate groove 1131 of a stationary valve plate 1131a which is adjacent to one end face of the conveyor 1016. The groove 1131 extends along an arc of approximately 270 degrees, namely, from a transfer station H between the intermediate conveyors 1016, 1038, past the aforementioned transfer station F, and to the transfer station A so that the cigarettes in the flutes 1026a arriving at the station F are attracted to the conveyor 1016 and remain in the respective portions 1004 during travel from the station F to the station A.

The body of the intermediate conveyor 1016 is further formed with radial suction ports 1030 which also communicate with the channels 1020 and the outer ends of which communicate with the recesses 1025. The purpose of the ports 1030 is to attract the trough-shaped portions 1004 during travel from the transfer station H, past the station F, and to the station B. It will be seen that the ports 1030 are analogous to the ports 1006, i.e., they also serve to retain the portions 1004.

The intermediate conveyor 1017 has recesses 1029 for the portions 1004 which enter such recesses at the transfer station C. Each recess 1029 is adjacent to a rotary plate-like permanent magnet 1031 which is mounted in the conveyor 1017 (see FIGS. 15 and 16). At least those portions 1017a) of the conveyor 1017 which are located between the recesses 1029 and the neighboring magnets 1031 consist of non-magnetic material. Each magnet 1031 is rigid with a shaft 1032 which is rotatable in the conveyor 1017 and carries a bell crank lever 1033. The bell crank levers 1033 can be pivoted by stationary posts 1034a, 1034b which are adjacent to the path of movement of magnets 1031 with the conveyors 1017. The magnets 1031 are not free to rotate in the conveyor 1017, i.e., it is necessary that the corresponding lever 1033 strike against and be pivoted by the post 1034a and 1034b before the magnet changes to angular position.

Each plate-like magnet 1031 can assume a first position in which it extends substantially radially of the conveyor 1017 and is then capable of retaining a trough-shaped portion 1004 in the adjacent recess 1029, and a second position in which it extends tangentially of the conveyor 1017 (see the magnet at the tree o'clock position of the conveyor 1017 in FIG. 12) in which it is incapable of holding a portion 1004 in the adjacent recess 1029.

The intermediate conveyor 1038 has recesses 1039 which can receive successive trough-shaped portions 1004 at a transfer station E and deliver the portions 1004 to the recesses 1025 at the transfer station H. Each recess 1039 is adjacent to a rotary plate-like permanent magnet 1041 having a shaft connected with a bell crank lever 1043 which can be pivoted by stationary posts 1044a, 1044b. The purpose of the magnet 1041 is analogous to that of the magnet 1031, i.e., they retain the trough-shaped portions 1004 in the respective recesses 1039 during travel between the transfer stations E and H.

The directions in which the conveyors 1026, 1016, 1027, 1028, 1017 and 1038 rotate are indicated by arrows.

The operation of the structure of FIGS. 12 to 16 is as follows.

Each recess 1025 which travels toward the transfer station F contains a portion 1004 of a flute 1002 because the portions 1004 are attracted by suction in the respective port or ports 1030. Also, each flute 1026a which approaches the transfer station F contains a filter cigarette Z of unit length because the flutes 1026 communicate with suction ports, not shown, or are overlapped by shrouds or analogous mechanical cigarette retaining means. The ports 1005 of a trough-shaped portion 1004 which is received in a recess 1025 and reaches the transfer station F are connected with the groove 1131 of the valve plate 1131a so that the ports 1005 attract the oncoming cigarette Z which leaves its flute 1026a (the retaining action upon a cigarette Z in a flute 1026a terminates at the station F) so that the cigarette Z enters the portion 1004 and advances therewith toward the transfer station B.

Since the groove 1131 of the valve plate 1131a ends shortly upstream of the transfer station B, the suction in an oncoming port 1006 of the conveyor 1027 suffices to effect the transfer of the portion 1004 and of the cigarette z thereinn onto the conveyor 1027 whereon the portions 1003, 1004 together form a complete flute or enclosure 1002 which engages the cigarette Z only in the regions of its ends and provides the space R (FIG. 13) around the wrapper of such cigarette. As mentioned above, suction in the ports 1006 and channels 1007 is relatively weak but is nevertheless sufficient to hold the portions 1004 against ejection by centrifugal force.

The wrappers of cigarettes Z are tested during travel from the transfer station C by sound waves which are generated at 1036 and are monitored by 1043. The sound waves enter the spaces R around the wrappers of cigarettes Z which travel between the transfer stations B and C. The manner in which the wrappers are tested is similar to that shown in FIG. 10 or 11. The arrow 1043a indicates the direction in which the electric signals produced by monitoring means 1043 are transmitted to a threshold circuit and to other components of an evaluating circuit similar to the circuit 44 of FIG. 2 and preferably serving to effect segregation of cigarettes with defective wrappers from satisfactory cigarettes. The threshold circuit can be said to constitute a means for comparing the signals from the monitoring means 1043 with signals which are indicative of satisfactory wrappers and to permit signals which are indicative of defective wrappers to reach the ejector.

At the transfer station C, the ports 1006 move beyond the groove 1008 of the valve plate 1009 but the channels 1018 begin to communicate with the groove 1021 so that the tested cigarettes Z remain in the portions 1003 of the flutes 1002 but the portions 1004 leave the connveyor 1027 and enter the oncoming recesses 1029 of the intermediate conveyor 1017 to which they are attracted by the respecive permanent magnets 1031. The groove 1021 of the valve plate 1009 ends at the transfer station D where the tested cigarettes Z enter the flutes 1024 of the conveyor 1028 to be retained therein by suction during testing of their tobacco-containing ends.

The magnets 1031 retain the trough-shaped portions 1004 in the respective recesses 1029 of the intermediate conveyor 1017 during travel from the transfer station C toward the transfer station E. At this station, successive bell crank levers 1033 strike against and are pivoted through about 90 degrees by the stationary post 1034a so that the magnets 1031 cease to attract the respective portions 1004 which are then attracted by the magnets 1041 of the intermediate conveyor 1038 to enter the oncoming recesses 1039 and to advance with the conveyor 1038 toward the transfer station H. At the station H, the bell crank levers 1043 are pivoted by the stationary post 1044a so that the magnets 1041 cease to attract the respective portions 1004 which enter the oncoming recesses 1025 of the conveyor 1016 under the action of suction in the respective ports 1030. Such portions 1004 then advance toward the transfer station F to receive cigarettes Z from the conveyor 1026.

A bell crank lever 1033 which advances beyond the transfer station E strikes against and is pivoted by the stationary post 1034b so that the respective magnet 1031 reassumes its first or operative position and can attract a trough-shaped portion 1004 upon arrival at the transfer station C. Analogously, the bell crank levers 1043 are pivoted by the stationary post 1044b downstream of the transfer station H so as to return the respective magnets 1041 to their first or operative positions not later than upon arrival at the transfer station E.

The cigarettes Z with defective wrappers can be ejected from the trough-shaped portions 1003 between the transfer stations C and D or downstream of the conveyor 1028; in the latter instance, the ejector which expels cigarettes Z with defective wrappers can also expel cigarettes having defective tobacco-containing ends.

It is clear that the permanent magnets 1031 and/or 1041 can be replaced by pneumatic means for attracting the trough-shaped portions 1004 to the intermediate conveyor 1017 and/or 1038.

The structure of FIGS. 12–16 is also suitable for testing of cigarettes Z with a gaseous fluid. For example, the component 1012 can be replaced with a testing device which examines a variable characteristic of air which is being withdrawn from the spaces R defined by flutes 1002 which travel from the transfer station B toward the transfer station C. Such pneumatic testing device can be connected to the ports 1006 or to one or both ends of a wrapper which travels between the transfer stations B and C. If connected with the ports 1006, the pneumatic testing device will detect a rise of fluid pressure as a result of the flow of air from the interior of a cigarette Z, through one or more leaks in its wrapper, and into the respective space R. If connected with one or both ends of the wrapper, the pneumatic testing device will determine the relatively high rate of air flow into the ends of the wrapper due to the presence of a leak in the wrapper and due to the fact that the pressure in the respective space R is below atmospheric pressure.

Through the testing of cigarettes or the like with a pneumatic testing medium is known, the structure of FIG. 12 renders it possible to enclose the wrappers during travel from the transfer station B to the transfer station C (i.e., to form spaces R) in a novel and improved way by resorting to simple two-piece flutes or enclosures 1002. Moreover, the structure of FIG. 12 renders it possible to test the wrappers of cigarettes Z during travel along a relatively long portion of the path wherein the cigarettes are transported from the turn-around device (conveyor 1026) to the second testing unit (conveyor 1028).

FIG. 17 illustrates a modified construction of means for sealing the ends of the wrapper of a cigarette Z from the surrounding space R. As shown, the open ends of the wrapper are engaged by two deformable membranes 1046, 1047. The membranes 1046, 1047 constitute the front walls of two chambers 1046a, 1047a which receives slightly compressed air or another gas from a source 1048 by way of a conduit 1049. The pressure of fluid in the chambers 1046a, 1047a is sufficient to insure a satisfactory sealing engagement between the membranes 1046, 1047 and the respective ends of the wrapper therebetween. The right-hand end Za of the wrapper of a cigarette Z between the membranes 1046, 1047 receives sound waves from a sound generator 1050 which is combined with a monitoring means 1051. The latter produces electrical signals whose intensity or another characteristic is indicative of the condition of a wrapper between the membranes 1046, 1047. The sound generator 1050 can be excited by a suitable oscillator in a manner as described in connection with FIGS. 2 to 11. The signals supplied by the monitoring means 1051 can be compared with signals indicating wrappers and, in the event of deviation from such signals, used to effect the segregation or corresponding cigarettes from cigarettes having satisfactory wrappers.

Figure 18:
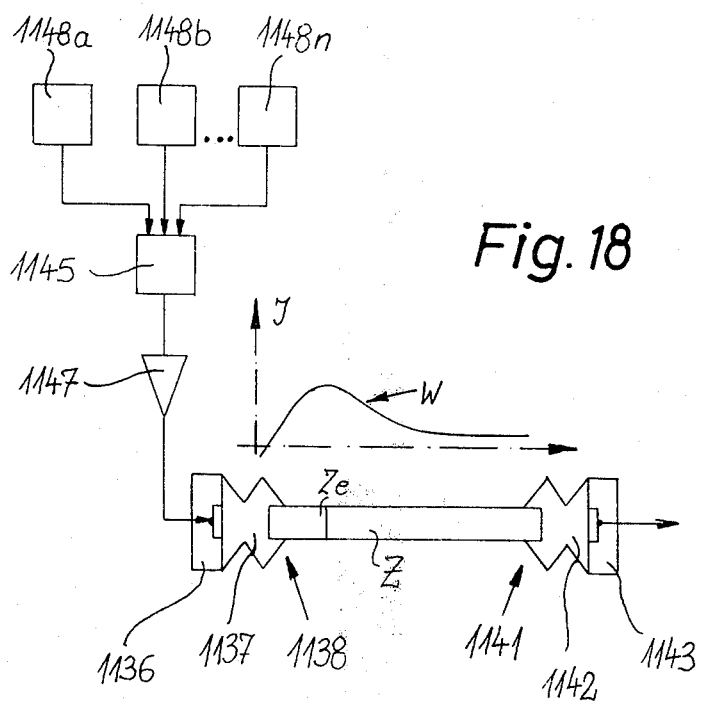
FIG. 18 is a fragmentary diagrammatic view of a further testing apparatus wherein the intensity of sound waves is varied lengthwise of the wrapper of an article which travels past the testing station.

FIG. 18 shows a portion of a further testing apparatus wherein the ends of the wrapper of a cigarette Z are engaged by a pair of sealing devices 1038, 1041. The monitoring means is shown at 1043 and the sound generator is shown at 1036. The sound generator is connected with the sealing device 1038 by sound conveying means 1037, and the sealing device 1042 is connected with the monitoring means 1043 by sound conveying means 1042.

The sound generator 1036 is connected with the output of an amplifier 1047 whose input is connected with the input of a summing circuit 1145. The latter has three inputs which are connected to discrete oscillators 1148a, 1148b...1148n. Each of these oscillators supplies different a-c voltage pulses and such pulses are superimposed upon each other by the circuit 1145 which supplies a resultant voltage signal to the amplifier 1147 and sound generator 1136. The distance between the sound generator 1036 and monitoring means 1043 is selected in such a way that there develops a standing wave (see the curve W) whose intensity J (i.e., the difference between maximum and minimum pressure of sound waves) varies as considered in the longitudinal direction of the cigarette Z at the testing station. The intensity is highest in the region Ze where the tobacco-containing filler of the cigarette Z is united with the filter tip, i.e., where the likelihood of leaks in the filter cigarette is normally much more pronounced than elsewhere. It is clear, however, that the curve W can be altered, for example, so that the intensity of sound is high along the intermediate portion of a cigarette Z and decreases gradually or abruptly at one or both ends where the presence of leaks is less critical because the outer end of the filter tip is placed into the mouth and the outer end of the tobacco-containing portion is combusted practically immediately in responnse to lighting.

An advantage of the testing apparatus of FIG. 18 is that it allows for more intensive testing of certain critical portions of a wrapper. Thus, and as shown in FIG. 18, the intensity of waves which are used for testing can be regulated in such a way that the testing action is most reliable at the juncture of a filter rod section and the aligned plain cigarette, i.e., where such parts are joined by a uniting band in a manner as described in connection with the wrapping conveyor 22 and rolling device 23 of FIG. 1. Furthermore, it is known that the wrappers of cigarettes can be formed with perforations to permit entry of cool atmosphere air while the smoke is being drawn into the mouth. It is evident that the regions of such perforations should not be tested with the same degree of intensity as the junctions between plain cigarettes and filter rod sections because this would result in segregation of all cigarettes whose wrappers have intentionally produced preforations.

It is further possible to modify the apparatus of FIG. 18 by using several sound generators each of which is connected with a discrete oscillator and to superimpose the sound waves produced by such generators to form regions of greater and smaller sound intensity as considered in the longitudinal direction of a wrapper at the testing station.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. A method of testing cigarettes or analogous rod-shaped articles wherein an open-ended tubular wrapper surrounds a filler of tobacco and/or filter material and the wrapper confines a first space and is surrounded by a second space, comprising the steps of passing sound waves into at least one of said spaces whereby a variable characteristic of sound is changed in the event there is a defect in the wrapper; monitoring said variable characteristic; and producing signals which are indicative of the extent of changes of said variable characteristic.

2. A method as defined in claim 1, wherein said characteristic is the intensity of sound.

3. A method as defined in claim 1, wherein said characteristic is the weakening of sound as a result of the passage of sound waves from said one space into the other of said spaces through a leak in the wrapper.

4. A method as defined in claim 1, wherein said one space is said first space.

5. A method as defined in claim 1, wherein said one space is said second space.

6. A method as defined in claim 1, wherein said first step comprises passing first sound waves into said first space and passing second sound waves into said second space, said second waves being phase-shifted with respect to said first sound waves.

7. A method as defined in claim 6, wherein said second sound waves are phase-shifted by 180°.

8. A method as defined in claim 1, wherein the frequency of said waves is between 200 and 600 hertz.

9. A method as defined in claim 1, further comprising the step of moving the articles during said first step.

10. A method as defined in claim 1, further comprising the step of utilizing said signals for segregation of articles with defective wrappers from articles with satisfactory wrappers.

11. A method as defined in claim 1, further comprising the step of changing the intensity of sound waves in the longitudinal direction of wrappers.

12. Apparatus for testing cigarettes analogous rod-shaped articles wherein an open-ended tubular wrapper surrounds a filler of tobacco and/or filter material and the wrapper separates a first space in the respective article from a second space which surrounds the wrapper, comprising means for transporting a succession of articles along a predetermined path past a testing station; means for generating sound waves; means for passing sound waves into at least one of the spaces separated by a wrapper at said testing station whereby a variable characteristic of sound is changed in the event there is a defect in the wrapper at said station; and means for receiving sound from said one space at said station, incuding means for producing signals which are indicative of the extent of changes of said variable characteristic.

13. Apparatus as defined in claim 12, wherein said generating means is stationary and said means for passing comprises a device for conveying sound waves from said stationary generating means into said one space at said testing station.

14. Apparatus as defined in claim 12, wherein said receiving means is stationary and further comprising means for conveying sound waves from said testing station to said receiving means.

15. Apparatus as defined in claim 12, wherein said transporting means comprises a conveyor having means for moving the articles sideways and means for sealing said one space at said testing station.

16. Apparatus as defined in claim 12, wherein said one space is said first space and futher comprising means for conveying sound waves from said generating means into succesive wrappers at said testing station.

17. Apparatus as defined in claim 12, wherein said one space is said second space and further comprising means for conveying sound waves from said generating means to the second spaces around successive wrappers at said testing station.

18. Apparatus as defined in claim 12, further comprising means for conveying sound waves from the first spaces in successive articles at said testing station to said receiving means.

19. Apparatus as defined in claim 12, further comprising means for conveying sound waves from the second spaces around successive wrappers at said testing station to said receiving means.

20. Apparatus as defined in claim 12, wherein said generating means includes means for producing sound waves in the frequency range of 200–600 cycles per second.

21. Apparatus as defined in claim 12, further comprising means for segregating articles with defective wrappers from satisfactory articles in response to said signals.

22. Apparatus as defined in claim 12, wherein said generating means comprises means for producing sound waves having different intensities and said means for passing includes means for changing the intensity of sound waves in the longitudinal direction of wrappers at said testing station.

* * * * *